Figure 1:
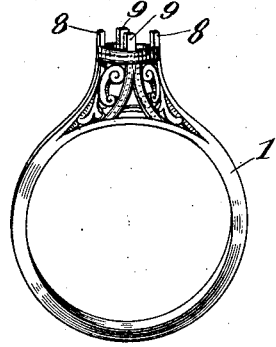

Oct. 15, 1929. T. MOUNTFORD 1,731,786
RING CONSTRUCTION
Filed May 3, 1922 2 Sheets-Sheet 1

Inventor
Thomas Mountford
J. T. Edmonds
Attorney

Oct. 15, 1929.　　T. MOUNTFORD　　1,731,786
RING CONSTRUCTION
Filed May 3, 1922　　2 Sheets-Sheet 2
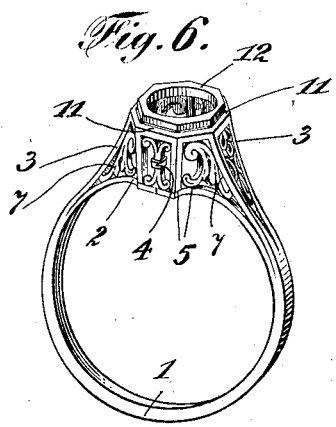
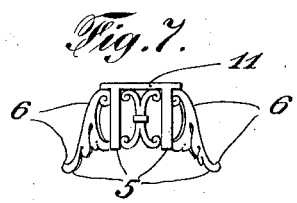
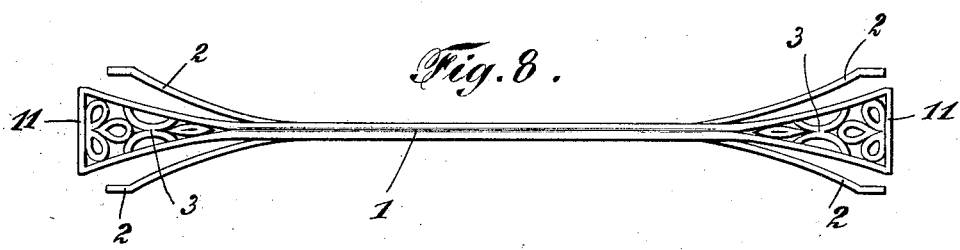
Inventor
Thomas Mountford
J. O. Edwards
Attorney Patented Oct. 15, 1929

1,731,786

UNITED STATES PATENT OFFICE

THOMAS MOUNTFORD, OF NEWARK, NEW JERSEY, ASSIGNOR TO BLANCARD & CO., INC., OF NEWARK, NEW JERSEY, A CORPORATION OF NEW JERSEY

RING CONSTRUCTION

Application filed May 3, 1922. Serial No. 558,296.

This invention relates to ring mountings.

Heretofore in the manufacture of rings including an extended decorative setting, usually of the perforated order, at the top, it has been customary to produce the major portion of the construction in two separate ring-like halves which are intended to be soldered together to form the complete shank and the two sides of the decorative setting. This soldering operation requires the abutting surfaces of the halves of this split shank to be straight and flat, but as these pieces are quite thin and are usually produced by a stamping operation, these surfaces are very often not flat and straight, with the result that the two halves must first be straightened before they can be soldered together properly. This separate straightening operation is troublesome and time-consuming. Moreover, even when the two surfaces are straight and flat, it is a very difficult and troublesome operation to solder the two halves together properly, since the two halves must be joined in exact alignment, both radial and circumferential, or the two major parts of the decorative top portion will also be out of alignment with each other and consequently the construction will be a failure. To complete this type of construction it is necessary to solder two small end pieces between the top portions at each end to make the setting continuous. The soldering in place of these end pieces is troublesome and time-consuming. The integral formation of the main setting portions and the shank halves prevent the shank from being used with settings of different designs or materials, and prevents removal or replacement of a setting on the shank. Even in a finished construction of this type, a line of solder will extend around the shank where the two halves have been soldered together. The shank must therefore, be finished, and it is difficult to obliterate the visual appearance of this line of solder. Wear will cause this line of solder to show up black and thus detract from the appearance of the construction.

It is the aim of my invention to provide a ring construction which is free from all the above mentioned objectionable features, and to provide a ring which is inexpensive and economical to construct and is attractive in appearance. Another object of my invention is to provide a ring requiring a minimum number of parts and very few operations in its manufacture. Another object of my invention is to provide a complete one-piece ring shank provided with means whereby one or more separate ornamental side pieces of various different designs or materials may readily, easily and securely be mounted on the shank, said means also permitting of the easy removal of one or more of the mounted side pieces and the substitution of others of similar or of different design or material. Other objects will be in part obvious and in part pointed out hereinafter.

In accordance with my invention, I provide a blank of metal so designed, that when properly bent to shape it forms a complete one-piece shank with an integral frame portion at the top upon which one or more separate ornamental side pieces may be mounted, as by soldering them thereon. Preferably I extend the two ends of the shank upwardly above the frame between the ends of the side pieces so that the side pieces may also be soldered to these ends of the shank. The shank ends may be arranged to cooperate with the side pieces to hold a jewel in place on the ring.

Figure 2:
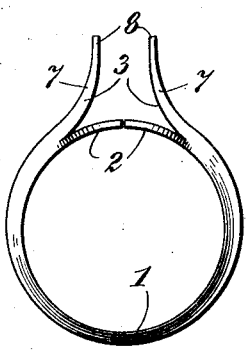
Figure 3:
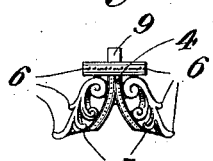
Figure 4:
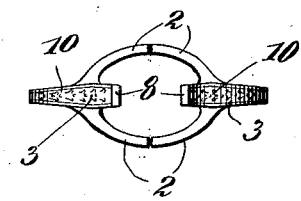
Figure 5:
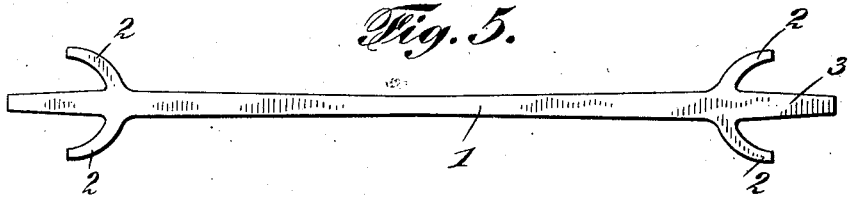

In order that a clearer understanding of my invention may be had, attention is hereby directed to the accompanying drawings forming a part of this application and illustrating certain possible embodiments of my invention. In the drawings, Fig. 1 is a perspective view of a ring embodying my invention; Fig. 2 is a side elevation of the main portion of the construction; Fig. 3 is a side elevation of one of the two separate ornamental side pieces, included in the complete ring as shown in Fig. 1; Fig. 4 is a view of the main portion of the construction from the top; Fig. 5 is a plan view of a blank for the main portion of the construction, and before it is bent to shape; Fig. 6 is a perspective view of a modified form of ring embodying my invention; Fig. 7 is a side elevation of one of the two separate ornamental side pieces included in the ring shown in Fig. 6; and Fig. 8 is a plan view of a blank for the main portion of the ring shown in Fig. 6, and before it is bent to shape. Similar reference characters refer to similar parts throughout the several views of the drawings.

Referring to the drawings, in the construction of my ring I first provide a blank of the desired metal, preferably by stamping, designed to constitute a complete one-piece shank and means for attaching ornamental side pieces thereto, and, if desired, means for holding a jewel in place on the ring. This blank includes a longitudinally extending central or body portion 1, and at each end of this longitudinal central portion 1, two oppositely disposed projecting portions or fingers or wings 2 and a longitudinally extending finger-like crown portion 3. I shape this blank by bending it so that the central portion 1 becomes a complete one-piece ring shank bent to shape and the four projecting fingers 2 cooperate to produce a base or a supporting frame of the desired configuration for one or more ornamental side pieces 4, and the crown portions 3 extend upwardly of this base. It is understood that the cooperating projecting fingers are soldered or otherwise secured together at their extremities as shown in the completed ring, Fig. 1. My construction also comprises one or more side pieces 4 which may be produced by stamping. I complete the ring by placing one or more of these ornamental side pieces 4 on the frame provided by fingers 2 and soldering the side pieces thereon. Preferably, two ornamental side pieces are used and the vertical finger portions 3 extend between the ends of these side portions, to which they may be soldered and thus be more firmly and securely held in place on the ring. The ornamental side pieces 4 are so designed that at their lower edges 5 they will seat upon the upper surface of the frame portions 2 and, if the fingers 3 are provided, will have side edges or points 6 abutting side surfaces 7 of the fingers 3. The soldering of the side pieces 4 to the pieces 2 and fingers 3 may be easily accomplished.

If it is desired to mount a jewel by means of cramps the upwardly projecting crown fingers 3 of the main portion of the ring may be extended to constitute cramps 8, and other cramps 9 may be provided on the tops of the ornamental side pieces 4 to cooperate with cramps 8 in holding a jewel in place on the ring. The parts, however, may be designed to provide different means for holding a jewel in place on the ring. For instance, the upper ends of fingers 3 and the upper edges of the ornamental side pieces 4 may be flat, as at 11, and the usual jewel-holding plate or ring member 12 may be soldered in place on portions 11.

It will be readily apparent that rings of different styles and designs may be made in accordance with my invention. The finger portions 3 may be narrow and solid, as shown in Figs. 4 and 5 or, if desired, these portions 3 may be widened and fashioned in perforated design, as shown in Figs. 6 and 8. If desired, a design may be stamped directly into the outer surface of the blank portion 1 and finger portions 3, as at 10, when the blank is produced.

It will be noted that by means of my method a complete ring requiring very few parts may be produced by a very few simple operations. The necessity of producing a split shank as formerly, and the difficult process heretofore required of welding these two halves together, with the resultant objectionable line of solder around the shank, are avoided. In addition, by my method a ring, comprising two different kinds of metal, may be easily provided. For instance, the main portion of the shank may be of one metal, such as green gold, and the side pieces 4 may be platinum.

Another advantage of my construction is that the shank portion of the ring construction may be associated with ornamental side pieces of any one of a number of different designs, or materials, as desired. In the prior construction the side portions were made integral with the shank portions, and, therefore, the use of the shank was limited to one design of setting. Moreover, it will be readily apparent that one or more of the ornamental side pieces may be readily and easily removed from the shank and new side pieces substituted in place of those removed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. A finger ring comprising a one-piece finger band having ends and having a pair of portions diverging sidewise in opposite directions at each end of the band and separate side pieces supported on said diverging portions at each side of the ring.

2. A finger ring comprising side pieces and a one-piece finger band having two pairs of diverging finger portions, said pairs of finger portions extending in opposite directions and having their extremities close together, and constituting a supporting frame for said side pieces.

3. A finger ring comprising a one-piece finger band having two pairs of diverging finger portions, said pairs of finger portions extending in opposite directions and having their extremities close together, and constituting a supporting frame for side pieces, said band having also a portion extending from the base of each pair of finger portions, and side pieces secured to said finger portions and to said extending portions.

4. A finger ring comprising a one-piece finger band having two pairs of diverging finger portions, said pairs of finger portions extending in opposite directions and having their extremities close together, and constituting a supporting frame for side pieces, said band having also a portion extending from the base of each pair of finger portions, side pieces secured to said finger portions and to said extending portions, and means on said extending portions and on said side pieces for securing a jewel in place on the ring.

5. A finger ring comprising a one-piece finger band having two pairs of diverging finger portions, said pairs of finger portions extending in opposite directions and having their extremities close together, and constituting a supporting frame for side pieces, said band having also a portion extending from the base of each pair of finger portions, side pieces secured to said finger portions and to said extending portions, and means, comprising cramp portions on said extending portions and on said side pieces, for securing a jewel in place on the ring.

6. A finger ring including a side piece, a one-piece finger-encircling strip having diverging frame portions at each end, the frame portions at opposite ends of the strip extending toward each other and being secured together at their extremities and constituting a supporting frame for said side pieces.

This specification signed and witnessed this 29th day of April, 1922.

THOMAS MOUNTFORD.